(No Model.) 2 Sheets—Sheet 1.
W. G. TILLON & J. W. CLAPP.
WARP STOP MOTION FOR LOOMS.
No. 289,871. Patented Dec. 11, 1883.
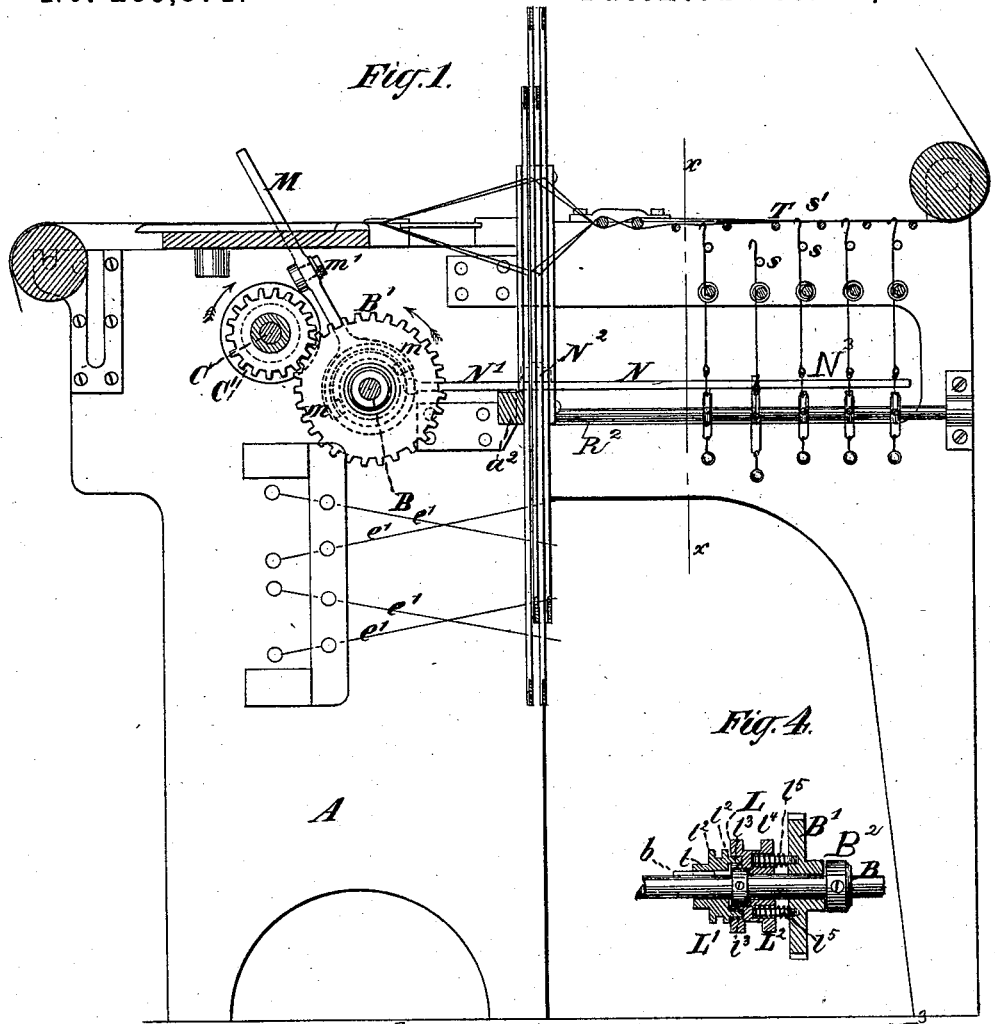
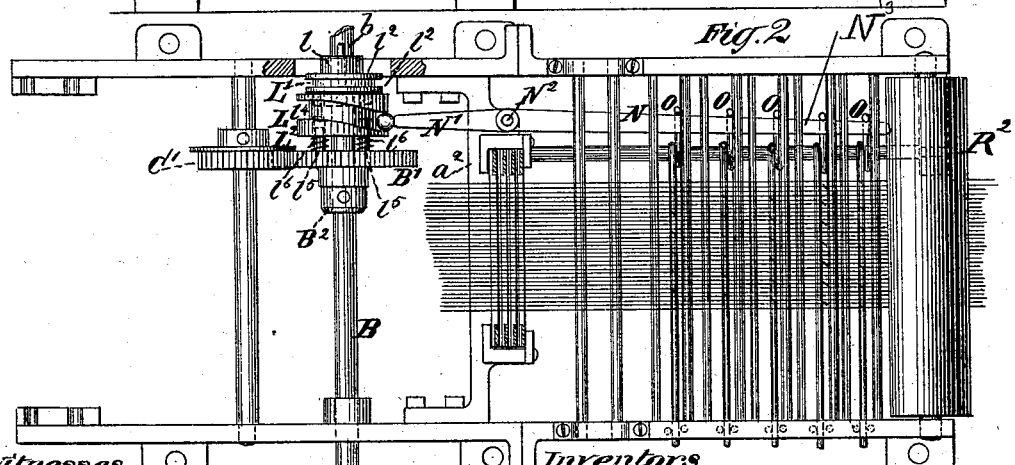

(No Model.) 2 Sheets—Sheet 2.
W. G. TILLON & J. W. CLAPP.
WARP STOP MOTION FOR LOOMS.
No. 289,871. Patented Dec. 11, 1883.
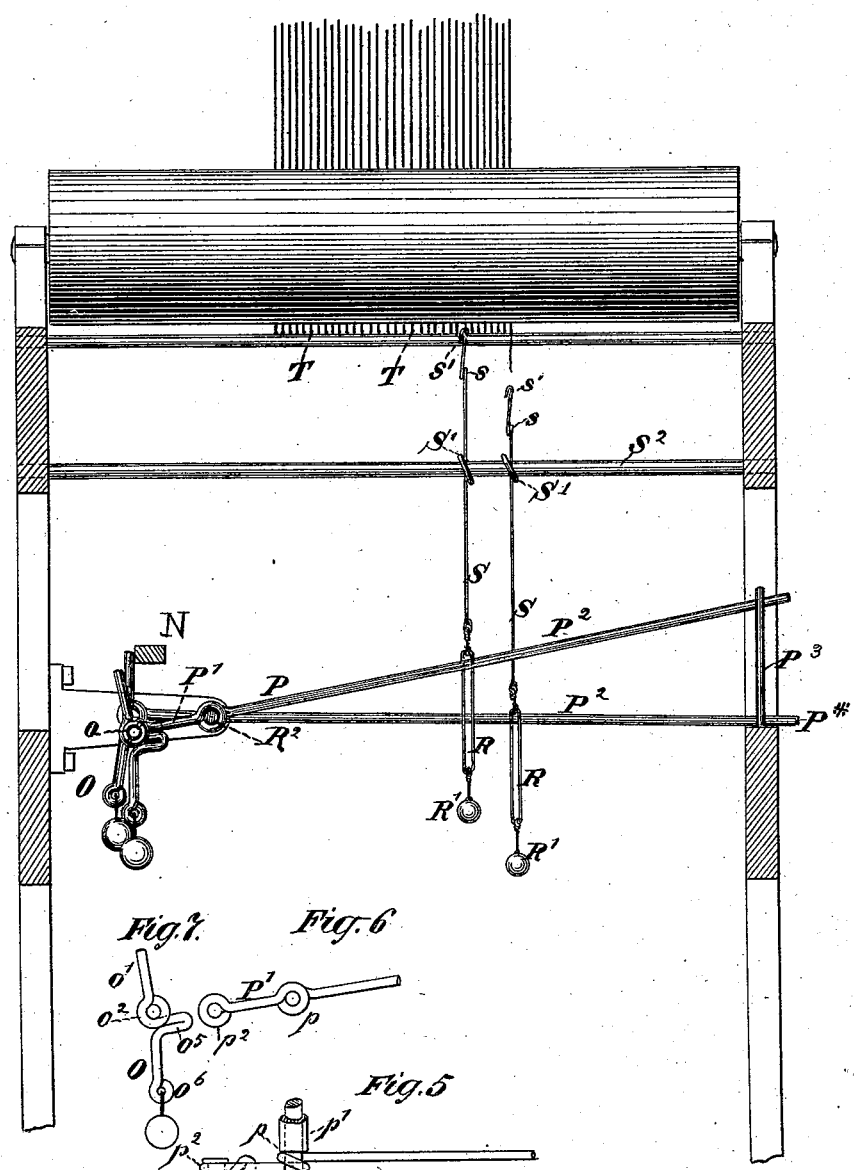

UNITED STATES PATENT OFFICE.

WALTER G. TILLON AND JOHN W. CLAPP, OF NEW HAVEN, CONNECTICUT, ASSIGNORS, BY DIRECT AND MESNE ASSIGNMENTS, TO CHAS. I. KANE AND ROBERT E. LESTER, BOTH OF NEW YORK, N. Y.

WARP STOP-MOTION FOR LOOMS.

SPECIFICATION forming part of Letters Patent No. 289,871, dated December 11, 1883.

Application filed October 9, 1882. (No model.)

*To all whom it may concern:*

Be it known that we, WALTER G. TILLON and JOHN W. CLAPP, citizens of the United States, both of the city and county of New Haven, in the State of Connecticut, have invented a new and useful Improvement in Warp Stop-Motions for Looms, of which the following is a specification.

Our invention consists of an improvement in what are commonly called "warp stop-motions" for looms for weaving; and it is particularly designed to be applied to looms, several of which are arranged in line and driven by one main shaft running through the whole series of looms.

The object of our invention is to make a convenient and effective provision for automatically disengaging the driving mechanism of either one or more of the looms of the series from the common main shaft in the event of the breaking or failing of any one of the warp-yarns without necessitating the stopping of the remaining looms.

In carrying out our invention we apply on the main shaft for each loom of the series a double clutch, one half of which is capable of being operated by a hand-lever, for the purpose of enabling the operator or attendant to stop the loom, while the other half is provided with a cam-course, adapted to operate one end of a pivoted vibrating lever, the opposite end of which at each vibration either passes or engages with one or more of a series of weighted levers, depending on whether all the warps are intact or whether some have broken or failed. Each of the weighted levers is peculiarly formed and mounted on a pin or axis carried by the short end of one of a series of drop-levers arranged at the rear of the loom, and mounted on a shaft parallel with the warps. The drop-levers are spaced on their shaft by means of short tubes or collars. The long end of each of the drop-levers is suitably guided, and passes through one of a series of elongated loops, the lower end of each of which is weighted, while its upper end is provided with a suspension or drop wire, which passes through a guide-ring carried by a cross-bar. At their upper ends the suspension or drop wires are formed with loops, to prevent their accidental passage through the guide-rings, and at their extreme upper ends they are formed with hooks, which are adapted to be applied to the individual warp-yarns at the time of starting the loom, and be suspended thereby until such time that a warp-yarn should break or fail, when the suspension or drop wire will immediately fall, and, by means of its intermediate mechanism, (as hereinafter more fully explained,) cause the second half of the clutch mechanism to automatically disconnect the main shaft and stop the loom in which the warp broke or failed, without causing or necessitating the stoppage of any other loom of the series.

The accompanying drawings form part of this specification, and illustrate what we consider the best means of carrying out our invention.

Figure 1 is a vertical section of so much of a loom with our improvement applied thereto as will illustrate the invention. Fig. 2 is a plan view of the same, with the upper plate, containing the raceway, removed. Fig. 3 is a vertical section taken transversely to the warps on the line $x\ x$, Fig. 1. Fig. 4 is a sectional view of part of the main shaft and the clutch mechanism separately. Fig. 5 is a detailed view of part of one of the drop-levers and its shaft and its weighted lever. Fig. 6 is a detached view of part of one of the drop-levers. Fig. 7 is a side view of one of the weighted levers separately.

In each of the views similar letters of reference are employed to indicate corresponding parts wherever they occur.

A represents the main framing, and B the main shaft, which receives motion from a driving-pulley. (Not shown.) Motion is communicated by means of gear-wheels B' and C' to a shaft, C, upon which are to be mounted the mechanism for operating the lay and the shuttle-motion. The wheel C' is mounted rigidly on the shaft C, while the wheel B' runs freely on its shaft B, unless held thereto as hereinafter explained.

L is a double clutch, one-half of which is applied to the main shaft B in the proper position for each loom of the series. The half L' of the clutch L is formed with a boss, $l$, capable of sliding freely on the shaft B in a direction parallel with the axis of the said shaft, and it is prevented from turning thereon by means of a feather, $b$.

Upon the boss $l$ of the half L' of the clutch L is formed a circular extension provided with flanges $l^2$, between which flanges $l^2$ the forked end $m$ of a hand-lever, M, constantly engages, which lever is pivoted on an axis, $m'$, carried by the main framing A.

On one face of the half L' of the clutch L are formed or applied pins or equivalent means, $l^3$, which engage with holes or recesses in the side of the second half, $L^2$, of the clutch L, in the periphery of which is formed a cam groove or course, $l^4$, adapted to operate one end, N', of a horizontally-vibrating lever, N, which is pivoted at $N^2$ to the cross-bar $a^2$, forming part of the main framing A.

The compound clutch L is connected with the wheel B' by means of studs, pins, or equivalent engaging means, $l^5$ $l^5$, formed on or applied to the face of the wheel B', and adapted to be received into corresponding recesses in the second half, $L^2$, of the clutch L. The half $L^2$ of the clutch L is held in its normal position by means of springs $l^6$ $l^6$, having a bearing against the wheel B', which itself is retained in position laterally on the side opposed to the clutch L by means of a collar, $B^2$, screwed or keyed on the shaft B, as shown in Figs. 2 and 4. The long end $N^3$ of the vibrating lever N at each revolution of the main shaft B is caused by the cam $l^4$ to either pass over or engage with one or more of a series of weighted levers, O, each of which is mounted on an axis, $o$, carried by the short arm, P', of one of a series of drop-levers, P, which are arranged at the rear of the loom and mounted on a shaft, $R^2$, arranged parallel with the warps.

The drop-levers P are, by preference, constructed of stout wire, bent, as shown, so as to form eyes $p$, which serve as hubs, and are received upon the shaft $R^2$, and there held in place by means of short tubes or collars, $p'$. The short arms P' of the levers P are also formed with eyes or loops $p^2$, which are firmly clinched or forged onto the axes $o$, upon which the weighted levers O are supported. The weighted levers O are also, by preference, formed of stout wire having a straight upper portion, $o'$, adapted for engagement with the vibrating lever N. The wire is then bent into the form of an eye or hub, $o^2$, adapted to be placed so as to move freely on the axis $o$, where it is secured by the washer $o^3$ and pin $o^4$.

After forming the eye or hub $o^2$, the wire is bent forward and retained at an angle forming a nose, $o^5$, adapted to engage with the short arm, P', of a lever, P. It is then carried downward and formed with an eye, $o^6$, to which is suspended a weight.

The weight and leverage of the levers O and the short arms P' of the levers should be such as to slightly overbalance the weight and leverage of the long arms $P^2$ of the levers P.

Each of the drop-levers P is kept in proper position by means of guides $P^3$, carried by the main framing A.

R R are a series of elongated loops, formed, by preference, of metal, and provided at their lower ends with weights R', one of each being provided for each warp-thread. At their upper ends each of the loops R is attached to the lower end of a drop-wire, S, which passes through a guide-ring, S', carried by a cross-bar, $S^2$. At their upper ends the drop-wires S are formed with loops $s$, to prevent their accidental passage through the guide-rings S', and at their extreme upper ends they are formed with hooks $s'$, one of each of which is adapted to be applied to each individual warp-yarn T at the time of starting the loom, and be suspended thereby until such time that a warp-yarn breaks or fails, when the drop-wire S, supported by the said yarn, will fall, and in so doing cause its weighted loop R to counterbalance the lever P and cause it to fall, as indicated at P*, Fig. 3. As the arm $P^2$ of said lever falls, its arm P' is raised, carrying with it the weighted lever O, and thereby causing the upper portion, $o'$, of the latter to be obtruded in the way of the lever N. The nose $o^5$, which extends under the arm P' of the lever P, prevents the weighted lever O from turning on its pivot when the lever N strikes it in moving outward, and it therefore forms a stop sufficiently rigid to arrest the movement of the lever N. The weighted lever O is, however, free to turn on its pivot when engaged by the lever N in the movement of the latter in the reverse direction, and also so that it will always hang vertically, even when the drop-lever P is raised. The outward movement of the end $N^3$ of the lever N being arrested, its end N' will serve as a fixed abutment, which, acting in the cam-course $l^4$, during the rotary motion of the clutch L, will move the part $L^2$ out of engagement with the part L', thus freeing the wheel B' from the shaft B, which continues to rotate, and stopping the shaft C and wheel C'. The loom will thus be stopped automatically, and remain stopped until the warp-yarn is mended or replaced and the loom again started by the attendant.

If the attendant wishes to stop any one of the looms, he has simply to operate the half L' of the double clutch L by means of the hand-lever M, when the loom will instantly stop and remain stopped until the half L' of the clutch L is replaced.

So long as all the warps remain intact the weighted levers O will offer no impediment to the motion of the vibrating lever N, and weaving will continue in its ordinary course.

Having thus described our invention, what we claim, and desire to secure by Letters Patent, is—

1. The combination, with the main or driving shaft and a clutch on said shaft, one-half of which is formed with a cam or cam-course, of a vibrating lever operated by the cam on the clutch, a series of weighted levers and drop-levers for controlling the operation of said vibrating lever, and drop-wires adapted to be suspended from the warp-yarns and serving to move said drop-levers on the breakage of the yarns, substantially as shown and described.

2. The combination, with the main shaft B, loose gear B', double clutch L, and a vibrating lever, N, of a weighted lever, O, and drop-lever P, the weighted lever O being capable of engagement with the drop-lever P in one direction and free in the other, and means for connecting the lever P with the warp-yarns, substantially as shown and described.

3. The combination, with the main shaft B, loose gear B', double clutch L, a vibrating lever, N, a pivoted weighted lever, O, formed with an angular extending nose, $o^5$, and a balanced pivoted drop-lever, P, formed with an axle, $o$, short arm P', and long arm $P^2$, of the weighted loops R, and drop-wires S, adapted to be suspended from the warps, substantially as and for the purpose described.

4. The combination, with the driving-shaft B and loose wheel B', of a clutch, L, formed in two parts, L'$L^2$, the latter being formed with a cam, $l^4$, the hand-lever M, for operating the part L', the vibrating lever N, operated by said cam $l^4$, the weighted levers O, the drop-levers P, carrying said levers O, and the drop-wires S, adapted to be suspended from the warp-yarns, substantially as shown and described.

5. The combination, with the main shaft B and the loose wheel B', held in place on one side by a fixed collar, of the double clutch L, having a part, L', formed with a groove, and a part, $L^2$, formed with a cam, $l^4$, pins $l^5$, and springs $l^6$, connecting said part $L^2$ with the said wheel B', the hand-lever M, engaging with said clutch portion L', the lever N, capable of operation by the cam $l^4$, and the drop-levers P, weighted levers O, and drop-wires S, for controlling the lever N, substantially as shown and described.

WALTER G. TILLON.
JOHN W. CLAPP.

Witnesses:
A. C. WETMORE,
F. W. BABCOCK.

It is hereby certified that in Letters Patent No. 289,871, granted December 11, 1883, upon the application of Walter G. Tillou and John W. Clapp, of New Haven, Connecticut, for an improvement in "Warp Stop-Motions for Looms," the name of the first-named applicant was erroneously written and printed "Tillon" instead of *Tillou*; and that the patent should be read with this correction therein to make it conform to the record of the case in the Patent Office.

Signed, countersigned, and sealed this 22d day of January, A. D. 1884.

[SEAL.] M. L. JOSLYN,
*Acting Secretary of the Interior.*

Countersigned:

BENJ. BUTTERWORTH,
*Commissioner of Patents.*